(12) United States Patent
Chen

(10) Patent No.: US 12,525,204 B2
(45) Date of Patent: Jan. 13, 2026

(54) GATE DRIVING CIRCUIT AND DISPLAY PANEL

(71) Applicant: Guangzhou China Star Optoelectronics Semiconductor Display Technology Co., LTd., Guangdong (CN)

(72) Inventor: Xiaohai Chen, Guangdong (CN)

(73) Assignee: Guangzhou China Star Optoelectronics Semiconductor Display Technology Co., Ltd., Guangzhou (CN)

( * ) Notice: Subject to any disclaimer, the term of this patent is extended or adjusted under 35 U.S.C. 154(b) by 0 days.

(21) Appl. No.: 18/964,329

(22) Filed: Nov. 29, 2024

(65) Prior Publication Data

US 2025/0252935 A1 Aug. 7, 2025

(30) Foreign Application Priority Data

Feb. 1, 2024 (CN) .......................... 202410149978.8

(51) Int. Cl.
*G09G 3/36* (2006.01)
*G09G 3/3266* (2016.01)

(52) U.S. Cl.
CPC ......... *G09G 3/3677* (2013.01); *G09G 3/3266* (2013.01); *G09G 2300/0842* (2013.01);
(Continued)

(58) Field of Classification Search
CPC ......... G09G 3/3677; G09G 2310/0286; G09G 2300/0408; G09G 3/3266
See application file for complete search history.

(56) References Cited

U.S. PATENT DOCUMENTS

2010/0026669 A1* 2/2010 Lee ...................... G09G 3/3677
257/E21.535
2010/0158188 A1* 6/2010 Lee ........................ G11C 19/28
377/79
(Continued)

FOREIGN PATENT DOCUMENTS

| CN | 106328084 A | 1/2017 |
| CN | 107123405 A | 9/2017 |
| CN | 108399899 A | 8/2018 |

OTHER PUBLICATIONS

Chinese Office Action issued in corresponding Chinese Patent Application No. 202410149978.8 dated Oct. 21, 2025, pp. 1-9.

*Primary Examiner* — Van N Chow
(74) *Attorney, Agent, or Firm* — PV IP PC; Wei Te Chung

(57) ABSTRACT

A gate driving circuit and a display panel are provided by the present application. An Nth stage gate driving circuit unit includes a first pull-up controlling module, a second pull-up controlling module, and a pull-up module. During a forward scanning, the first pull-up controlling module is configured to render the pull-up module to be turned on at the beginning of a scanning, and is further configured to pulled down a potential of the output terminal of the Nth stage gate driving circuit unit to a low potential at the end of the scanning. During a reverse scanning, the second pull-up controlling module is further configured to render the pull-up module to be turned on at the beginning of a scanning, and is configured to pull down a potential of the output terminal of the Nth stage gate driving circuit unit to a low potential at the end of the scanning.

20 Claims, 6 Drawing Sheets

(52) U.S. Cl.
CPC ............... *G09G 2310/0286* (2013.01); *G09G 2330/021* (2013.01)

(56) References Cited

U.S. PATENT DOCUMENTS

| | | | |
|---|---|---|---|
| 2010/0201668 A1* | 8/2010 | Ko | G09G 3/3677 345/55 |
| 2016/0182042 A1* | 6/2016 | Kim | G06F 1/04 327/109 |
| 2017/0025068 A1* | 1/2017 | Jeoung | G09G 3/3266 |
| 2017/0076683 A1* | 3/2017 | Lee | G09G 3/3266 |
| 2019/0019442 A1 | 1/2019 | Xu | |
| 2019/0066604 A1* | 2/2019 | Kong | G09G 3/3291 |
| 2020/0226995 A1 | 7/2020 | Dai | |
| 2025/0087167 A1* | 3/2025 | Deng | G09G 3/3677 |

* cited by examiner

GATE DRIVING CIRCUIT AND DISPLAY PANEL

TECHNICAL FIELD

The present application relates to the field of display technologies, and especially relates to a gate driving circuit and a display panel.

BACKGROUND

Currently, thin film transistor liquid crystal displays (TFT-LCD) have become a mainstream display technology, and are widely used in various electronic products. An important technology in a process of manufacturing liquid crystal displays is gate driver on array (GOA) technology, that is, a technology that a gate driving circuit is formed on an array substrate of a liquid crystal display panel to achieve a driving mode of the gate driving circuit for scanning by line.

In-cell touch display panel products applied to active pens in prior art only support a scanning along one direction. The scanning along one direction reduce stability of gate driving circuits of the array substrates. In addition, the gate driving circuits of the array substrates require strong external driving capability, so that power consumption of the gate driving circuits of the array substrates are increased, and service life of the gate driving circuits of the array substrates are reduced.

Thus, it is necessary to provide a gate driving circuit and a display panel to improve the defect.

SUMMARY

Embodiments of the present application provide a gate driving circuit and a display panel, to realize two scanning modes of a forward scanning and a reverse scanning of an in-cell touch display panel applied to an active pen, thereby increasing freedom of use of the display panel, and reducing power consumption of the display panel.

Embodiments of the present application provide a gate driving circuit, the gate driving circuit includes a plurality of gate driving circuit units connected in cascade. An Nth stage gate driving circuit unit includes:
a first pull-up controlling module electrically connected to an output terminal of an (N−2)th stage gate driving circuit unit and a first node, respectively;
a second pull-up controlling module electrically connected to an output terminal of an (N+2)th stage gate driving circuit unit and the first node, respectively;
a pull-up module configured to receive an Nth stage clock signal, and electrically connected to the first node and an output terminal of the Nth stage gate driving circuit unit; and
a pull-down maintaining module configured to receive the direct current low level signal, and electrically connected to the first node and the output terminal of the Nth stage gate driving circuit unit, respectively;
wherein during a forward scanning, the first pull-up controlling module is configured to render the pull-up module to be turned on at the beginning of a scanning, and the pull-up module is further configured to pulled down a potential of the output terminal of the Nth stage gate driving circuit unit to a low potential at the end of the scanning; and during a reverse scanning, the second pull-up controlling module is configured to render the pull-up module to be turned on at the beginning of a scanning, and the pull-up module is further configured to pull down a potential of the output terminal of the Nth stage gate driving circuit unit to a low potential at the end of the scanning.

According to an embodiment of this application, the first pull-up controlling module includes a first transistor, a gate and a first terminal of the first transistor are electrically connected to the output terminal of the (N−2)th stage gate driving circuit unit, and a second terminal of the first transistor is electrically connected to the first node;
the second pull-up controlling module includes a second transistor, a gate and a first terminal of the second transistor are electrically connected to the output terminal of the (N+2)th stage gate driving circuit unit, and a second terminal of the second transistor is electrically connected to the first node.

According to an embodiment of this application, the pull-up module includes a third transistor, a gate of the third transistor is electrically connected to the first node, a first terminal of the third transistor is configured to receive the Nth stage clock signal, and a second terminal of the third transistor is electrically connected to the output terminal of the Nth stage gate driving circuit unit.

According to an embodiment of this application, the pull-down maintaining module includes a first pull-down maintaining module and a second pull-down maintaining module; the first pull-down maintaining module is configured to receive a first clock signal and the direct current low level signal, and is electrically connected to the first node and the output terminal of the Nth stage gate driving circuit unit, respectively;
the second pull-down maintaining module is configured to receive a second clock signal and the direct current low level signal, and the second pull-down maintaining module is electrically connected to the first node and the output terminal of the Nth stage gate driving circuit unit.

According to an embodiment of this application, the first pull-down maintaining module includes a fifth transistor, a sixth transistor, a seventh transistor, an eighth transistor, a ninth transistor, and a tenth transistor; and
a gate and a first terminal of the fifth transistor, and a first terminal of the sixth transistor are configured to receive the first clock signal; a second terminal of the fifth transistor is electrically connected to a gate of the sixth transistor and a first terminal of the seventh transistor; a second terminal of the sixth transistor is electrically connected to a first terminal of the eighth transistor, a gate of the ninth transistor, and a gate of the tenth transistor; a gate of the seventh transistor, a gate of the eighth transistor and a first terminal of the tenth transistor are electrically connected to the first node; a first terminal of the ninth transistor is electrically connected to the output terminal of the Nth stage gate driving circuit unit; and a second terminal of the seventh transistor, a second terminal of the eighth transistor, a second terminal of the ninth transistor, and a second terminal of the tenth transistor are configured to receive the direct current low level signal.

According to an embodiment of this application, the second pull-down maintaining module includes an eleventh transistor, a twelfth transistor, a thirteenth transistor, a fourteenth transistor, and a fifteenth transistor, and a sixteenth transistor; and
a gate and a first terminal of the eleventh transistor, and a first terminal of the twelfth transistor are configured to receive the second clock signal; a second terminal of the eleventh transistor is electrically connected to a gate of the twelfth transistor and a first terminal of the thirteenth transistor; a second terminal of the twelfth transistor is electrically connected to a first terminal of the fourteenth transistor, a gate of the fifteenth transistor, and a gate of the sixteenth transistor; a gate of the thirteenth transistor, a gate of the fourteenth transistor, and a first terminal of the sixteenth transistor are electrically connected to the first node; a first terminal of the fifteenth transistor is electrically connected to the output terminal of the Nth stage gate driving circuit unit; and a second terminal of the thirteenth transistor, a second terminal of the fourteenth transistor, a second terminal of the fifteenth transistor, and a second terminal of the sixteenth transistor are configured to receive the direct current low level signal.

According to an embodiment of this application, the pull-down maintaining module further includes a pull-down module, the pull-down module includes a fourth transistor, a gate of the fourth transistor is configured to receive the (N+6)th stage clock signal, a first terminal of the fourth transistor is electrically connected to the first node, and a second terminal of the fourth transistor is configured to receive the direct current low level signal.

According to an embodiment of this application, the Nth stage gate driving circuit unit further includes a bootstrap capacitor, and the bootstrap capacitor is electrically connected to the first node and the output terminal of the Nth stage gate driving circuit unit.

According to an embodiment of this application, the Nth stage gate driving circuit unit further includes a reset module, the reset module includes:
  a seventeenth transistor, wherein a gate of the seventeenth transistor is configured to receive a reset signal, a first terminal of the seventeenth transistor is electrically connected to the first node, and a second terminal of the seventeenth transistor is configured to receive the direct current low level signal; and
  an eighteenth transistor, wherein a gate of the eighteenth transistor is configured to receive the reset signal, a first terminal of the eighteenth transistor is electrically connected to the output terminal of the Nth stage gate driving circuit unit, and a second terminal of the eighteenth transistor is configured to receive the direct current low level signal.

Embodiments of the present application further provides a display panel, the display panel includes the gate driving circuit mentioned above.

Beneficial effects of embodiments of the present application: embodiments of the present application provide a gate driving circuit and a display panel. The gate driving circuit includes a plurality of driving circuit units in cascade. An Nth stage gate driving circuit unit includes a first pull-up controlling module, a second pull-up controlling module, a pull-up module, and a pull-down maintaining module. During a forward scanning, the first pull-up controlling module is configured to render the pull-up module to be turned on at the beginning of a scanning, and the pull-up module is configured to pulled down a potential of the output terminal of the Nth stage gate driving circuit unit to a low potential at the end of the scanning. During a reverse scanning, the second pull-up controlling module is configured to render the pull-up module to be turned on at the beginning of a scanning, and the pull-up module is configured to pull down a potential of the output terminal of the Nth stage gate driving circuit unit to a low potential at the end of the scanning. Thus, two scanning modes of the forward scanning and the reverse scanning of the in-cell touch display panel applied to active pen are achieved, thereby increasing freedom of use of the display panel, and reducing power consumption of the display panel.

DETAILED DESCRIPTION OF THE EMBODIMENT

Figure 1:
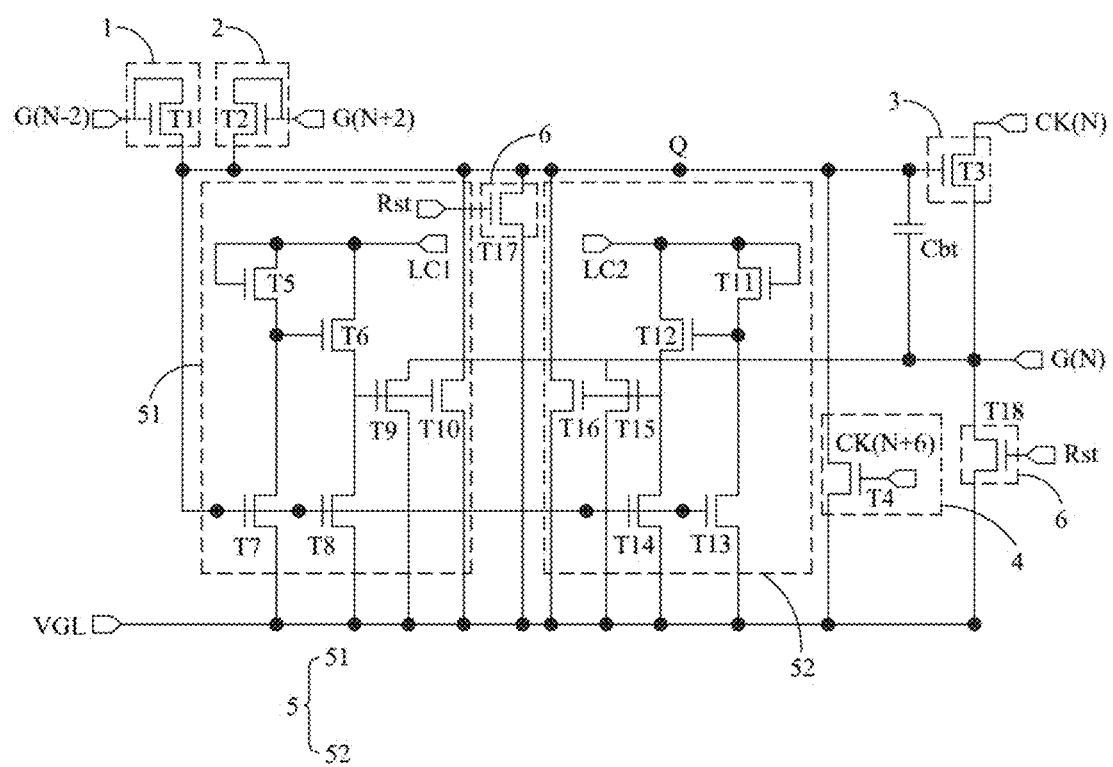
FIG. 1 is a schematic structural diagram of a gate driving circuit provided by an embodiment of the present application.

The following description of the various embodiments is provided to illustrate the specific embodiments of the invention. Directional terms mentioned in the present invention, such as "vertical", "horizontal", "upper", "bottom", "pre", "post", "left", "right", "inside", "outside", "side", etc., only refer to the direction of the additional drawing. Therefore, the directional terminology used is for the purpose of illustration and understanding of the invention, but is not for limiting the present application. In the drawings, structurally similar elements are denoted by the same reference numerals.

The present application is further described below in conjunction with the accompanying drawings and specific embodiments.

Embodiments of the present application provide a gate driving circuit and a display panel, to realize two scanning modes of a forward scanning and a reverse scanning of an in-cell touch display panel applied to active pen, thereby increasing freedom of use of the display panel and reducing power consumption of the display panel.

As shown in FIG. 1, FIG. 1 is a schematic structural diagram of a gate driving circuit provided by an embodiment of the present application. The gate driving circuit includes a plurality of gate driving circuit units connected in cascade. An Nth stage gate driving circuit unit includes a first pull-up controlling module 1, a second pull-up controlling module 2, a pull-up module 3, a pull-down module 4 and a pull-down maintaining module 5.

The first pull-up controlling module 1 is electrically connected to an output terminal G(N−2) of an (N−2)th stage gate driving circuit unit and a first node Q, respectively. The second pull-up controlling module 2 is electrically connected to an output terminal G(N+2) of an (N+2)th stage gate driving circuit unit and the first node Q, respectively. The pull-up module 3 is configured to receive an Nth stage clock signal CK(N), and is electrically connected to the first node Q and an output terminal G(N) of the Nth stage gate driving circuit unit. The pull-down module 4 is configured to receive an (N+6)th stage clock signal CK(N+6) and a direct current low level signal VGL, and is electrically connected to the first node Q. The pull-down maintaining module 5 is configured to receive the direct current low level signal VGL, and is electrically connected to the first node Q and the output terminal G(N) of the Nth stage gate driving circuit unit, respectively.

During a forward scanning, the first pull-up controlling module 1 is configured to render the pull-up module 3 to be turned on at the beginning of a scanning, the pull-up module 3 is configured to receive the Nth stage clock signal CK(N), and a potential of the Nth stage clock signal CK(N) is a high potential, so that a potential of the output terminal G(N) of the Nth stage gate driving circuit unit is raised from a low potential to the high potential. At the end of the scanning, a potential of the Nth stage clock signal CK(N) is a low potential, so that a potential of the output terminal G(N) of the Nth stage gate driving circuit unit is pulled down from the high potential to a low potential, a potential of the (N+6)th stage clock signal CK(N+6) is a high potential, so that the pull-down module 4 is turned on and is configured to pull down a potential of the first node Q from the high potential to a low potential. During a reverse scanning, the second pull-up controlling module 2 is configured to render the pull-up module 3 to be turned on at the beginning of the scanning, the pull-up module 3 is configured to receive the Nth stage clock signal CK(N), and a potential of the Nth stage clock signal CK(N) is a high potential, so that a potential of the output terminal G(N) of the Nth stage gate driving circuit unit is raised from a low potential to the high potential. At the end of the scanning, a potential of the Nth stage clock signal CK(N) is a low potential, so that a potential of the output terminal G(N) of the Nth stage gate driving circuit unit is pulled down from the high potential to the low potential, a potential of the (N+6)th stage clock signal CK(N+6) is a high potential, the pull-down module 4 is turned on and is configured to pull down a potential of the first node Q to a low potential. As such, two scanning modes of the forward scanning and the reverse scanning can be realized, thereby increasing freedom of use of the display panel and reducing power consumption of the display panel.

In one embodiment, as shown in FIG. 1, taking the Nth stage gate driving circuit unit as an example, the first pull-up controlling module 1 includes a first transistor T1. A gate and a first terminal of the first transistor T1 are both electrically connected to the output terminal G(N−2) of the (N−2)th stage gate driving circuit unit to receive an (N−2)th stage scanning signal output by the (N−2)th stage gate driving circuit unit. A second terminal of the first transistor T1 is electrically connected to the first node Q. N is a natural number, and is greater than 2. It should be noted that the first terminal of the first transistor T1 refers to one of a source electrode and a drain electrode, and the second terminal of the first transistor T1 refers to another one of the source electrode and the drain electrode. The same is true for the structures of other transistors in the present application, which is not be described in detail later. The second pull-up controlling module 2 includes a second transistor T2. A gate and a first terminal of the second transistor T2 are both electrically connected to the output terminal G(N+2) of the (N+2)th stage gate driving circuit unit to receive an (N+2) stage scanning signal output by the output terminal G(N+2) of the (N+2)th stage gate driving circuit unit. A second terminal of the second transistor T2 is electrically connected to the first node Q.

Figure 2:
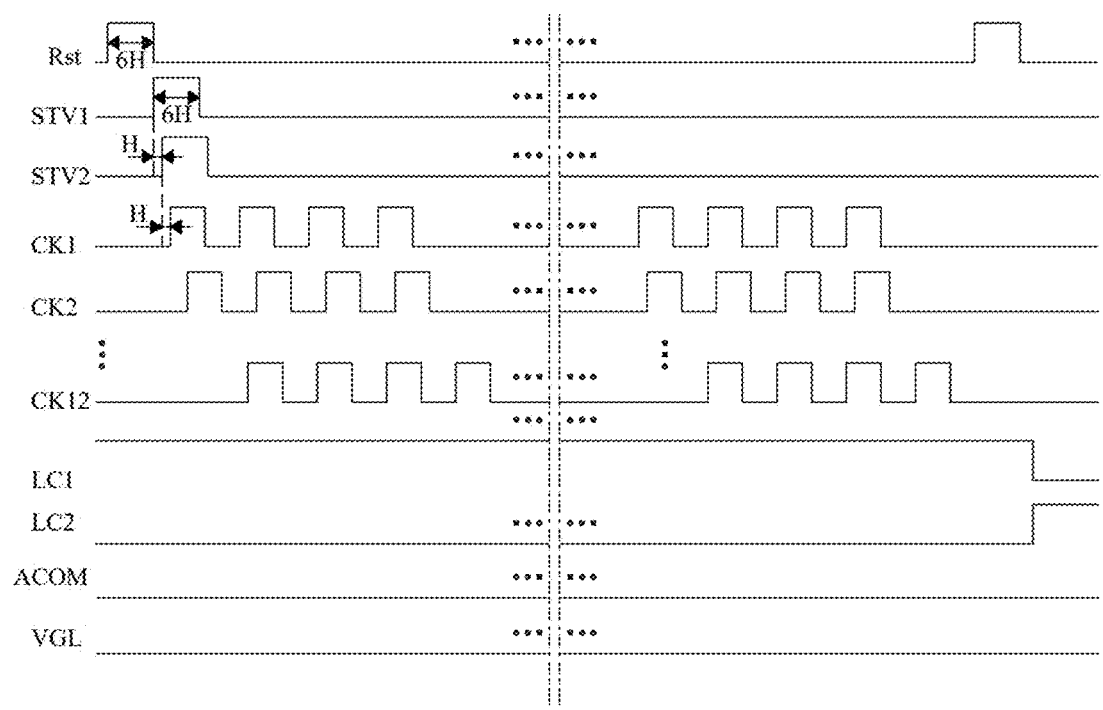
FIG. 2 is a timing diagram of the gate driving circuit provided by an embodiment of the present application.

As shown in FIG. 2, FIG. 2 is a timing diagram of the gate driving circuit provided by an embodiment of the present application. In the embodiment of the present application, N is greater than or equal to 3. A first stage gate driving circuit unit and a second stage gate driving circuit unit have substantially the same circuit configuration as other stages of gate driving circuit units, the difference is that, a gate of the first transistor T1 in the first stage gate driving circuit unit is connected to a first start signal terminal STV1 to receive a first start signal, and a second transistor T2 is electrically connected to an output terminal G(3) of a third stage gate driving circuit unit; and a gate of a first transistor T1 of the second stage gate driving circuit unit is electrically connected to a second start signal terminal STV2 to receive a second start signal, and a second transistor T2 is electrically connected to an output terminal G(3) of a fourth stage gate driving circuit unit. A width of an interval time between a rising edge of the second start signal and a rising edge of the first start signal is 1H. A width of an interval time between a rising edge of the first stage clock signal CK1 and a rising edge of a second start signal is 1H. A width of an interval time of rising edges of any two adjacent ones of the stage clock signals is 1H.

As shown in FIG. 1, the pull-up module 3 includes a third transistor T3. A gate of the third transistor T3 is electrically connected to the first node Q. A first terminal of the third transistor T3 is configured to receive the Nth stage clock signal CK(N). A second terminal of the third transistor T3 is electrically connected to the Nth stage scanning signal output terminal G(N).

As shown in FIG. 1, the pull-down module 4 includes a fourth transistor T4. A gate of the fourth transistor T4 is configured to receive the (N+6)th stage clock signal CK(N+6). A first terminal of the fourth transistor T4 is electrically connected to the first node Q. A second terminal of the fourth transistor T4 is configured to receive the direct current low level signal VGL.

In some embodiments, the pull-down maintaining module 5 includes a first pull-down maintaining module 51 and a second pull-down maintaining module 52. The first pull-down maintaining module 51 is configured to receive a first clock signal LC1 and the direct current low level signal VGL, and is electrically connected to the first node Q and the Nth stage scanning signal output terminal G(N), respectively. The second pull-down sustaining module 52 is configured to receive a second clock signal LC2 and the direct current low level signal VGL, and is electrically connected to the first node Q and the Nth stage scanning signal output terminal G(N).

As shown in FIG. 2, phases of the first clock signal LC1 and the second clock signal LC2 are opposite. That is, in a case that the first clock signal LC1 is at a high potential, the second clock signal LC2 is at a low potential. In a case that the first clock signal LC1 is at a low potential, the second clock signal LC2 is at a high potential. As such, the first pull-down maintaining module 51 and the second pull-down maintaining module 52 can alternately work, so that potentials of the first node Q and the Nth stage scanning signal output terminal G(N) maintain low potentials at the end of the forward scanning or the end of the reverse scanning. The first clock signal LC1 and the second clock signal LC2 both switch between a high potential and a low potential at intervals of a certain number of frames. For example, the first clock signal LC1 switches from a high potential to a low potential or from a low potential to a high potential every 100 frames, and the second clock signal LC2 switches from a low potential to a high potential or from a high potential to a low potential every 100 frames.

In one embodiment, as shown in FIG. 1, the first pull-down maintaining module 51 includes a fifth transistor T5, a sixth transistor T6, a seventh transistor T7, an eighth transistor T8, a ninth transistor T9 and a tenth transistor T10. A gate and a first terminal of the fifth transistor T5, and a first terminal of the sixth transistor T6 are configured to receive the first clock signal LC1. A second terminal of the fifth transistor T5 is electrically connected to a gate of the sixth transistor T6 and a first terminal of the seventh transistor T7. A second terminal of the sixth transistor T6 is electrically connected to a first terminal of the eighth transistor T8, a gate of the ninth transistor T9, and a gate of the tenth transistor T10. A gate of the seventh transistor T7, a gate of the eighth transistor T8 and a first terminal of the tenth transistor T10 are both electrically connected to the first node Q. A first terminal of the ninth transistor T9 is electrically connected to the Nth stage scanning signal output terminal G(N). A second terminal of the transistor T7, a second terminal of the eighth transistor T8, a second terminal of the ninth transistor T9, and a second terminal of the tenth transistor T10 are configured to receive the direct current low level signal VGL.

In one embodiment, as shown in FIG. 1, the second pull-down maintaining module 52 includes an eleventh transistor T11, a twelfth transistor T12, a thirteenth transistor T13, a fourteenth transistor T14, a fifteenth transistor T15 and a sixteenth transistor T16. A gate and a first terminal of the eleventh transistor T11, and a first terminal of the twelfth transistor T12 are configured to receive the second clock signal LC2. A second terminal of the eleventh transistor T11 is electrically connected to a gate of the twelfth transistor T12 and a first terminal of the thirteenth transistor T13. A second terminal of the twelfth transistor T12 is electrically connected to a first terminal of the fourteenth transistor T14, a gate of the fifteenth transistor T15, and a gate of the sixteenth transistor T16. A gate of the thirteenth transistor T13, a gate of the fourteenth transistor T14, and a first terminal of the sixteenth transistor T16 are all electrically connected to the first node Q. A first terminal of the fifteenth transistor T15 is electrically connected to the Nth stage scanning signal output terminal G(N). A second terminal of the thirteenth transistor T13, a second terminal of the fourteenth transistor T14, a second terminal of the fifteenth transistor T15, and a second terminal of the sixteenth transistor T16 are configured to receive the direct current low level signal VGL.

In one embodiment, as shown in FIG. 1, the Nth stage gate driving circuit unit further includes a bootstrap capacitor Cbt. The bootstrap capacitor Cbt is electrically connected to the first node Q and the Nth stage scanning signal output terminal G(N).

In some embodiments, the Nth stage gate driving circuit unit further includes a reset module 6. The reset module 6 is electrically connected to the first node Q and the output terminal G(N) of the Nth stage gate driving circuit unit, respectively. The reset module 6 is configured to receive a reset signal Rst and the direct current low level signal VGL. The reset module 6 is configured to reset a potential of the first node Q and the output terminal G(N) of the Nth stage gate driving circuit unit before the beginning of a scanning, so as to prevent operation result of a previous scanning cycle from affecting the current scan cycle, and to prevent circuit from failing due to charge accumulation during long-term operation.

In one embodiment, as shown in FIG. 1, the reset module 6 includes a seventeenth transistor T17 and an eighteenth transistor T18. A gate of the seventeenth transistor T17 is configured to receive the reset signal Rst. A first terminal of the seventeenth transistor T17 is electrically connected to the first node Q. A second terminal of the seventeenth transistor T17 is configured to receive the direct current low level signal VGL. A gate of the eighteenth transistor T18 is configured to receive the reset signal Rst. A first terminal of the eighteenth transistor T18 is connected to the output terminal G(n) of the Nth stage gate driving circuit unit. The second terminal of the eighteenth transistor T18 is configured to receive the direct current low level signal VGL.

Figure 3:
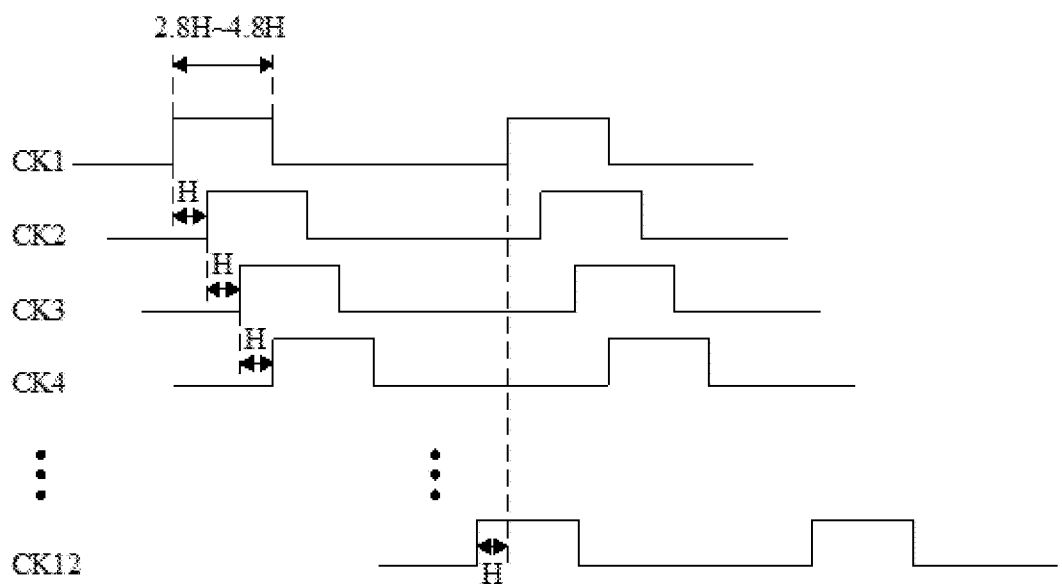
FIG. 3 is a timing diagram of an Nth stage clock signal provided by an embodiment of the present application.
Figure 4:
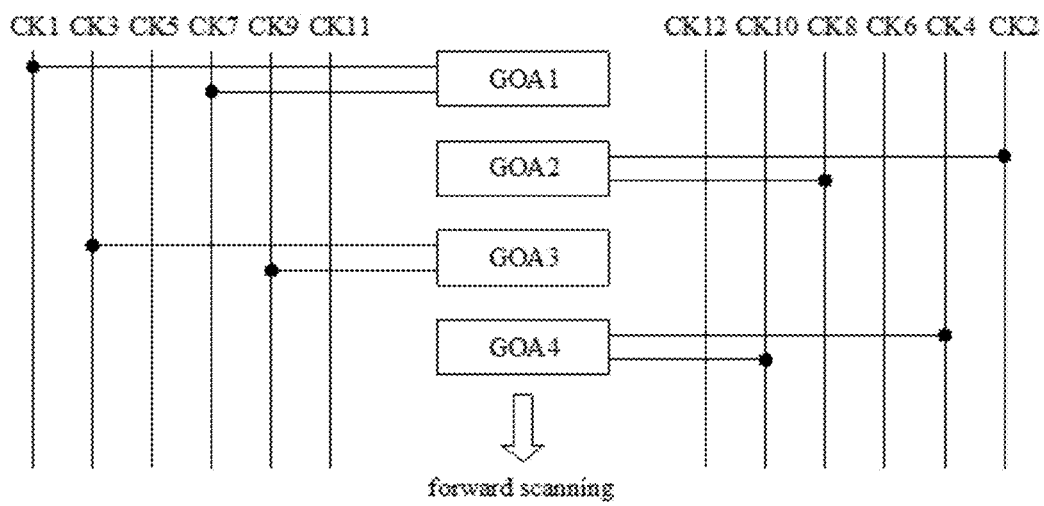
FIG. 4 is a schematic diagram of a forward scanning provided by an embodiment of the present application.

As shown in FIG. 3 and FIG. 4, FIG. 3 is a timing diagram of an Nth stage clock signal provided by an embodiment of the present application, FIG. 4 is a schematic diagram of a forward scanning provided by an embodiment of the present application. A time that an Nth stage clock signal CKN is at a high potential in any one frame scanning period is 2.8H to 4.8H, and an interval between rising edges of any two adjacent stages of clock signals is 1H. During the forward scanning, the first stage gate driving circuit unit GOAL is scanned from top to bottom to the last stage gate driving circuit unit.

Figure 5:
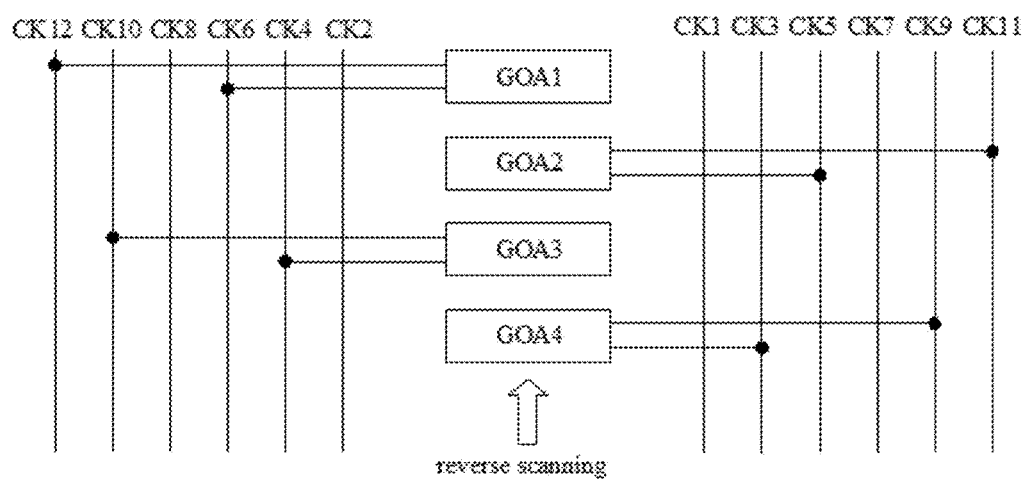
FIG. 5 is a schematic diagram of a reverse scanning provided by an embodiment of the present application.

As shown in FIG. 3 and FIG. 5, FIG. 5 is a schematic diagram of a reverse scanning provided by an embodiment of the present application. During a reverse scanning, a waveform of a first stage clock signal CK1 and a waveform of a twelfth stage clock signal CK12 in FIG. 3 are exchanged, a waveform of a second stage clock signal CK2 and a waveform of the eleventh stage clock signal CK11 in FIG. 3 are exchanged, and then make an analogy based on these. From bottom to top, a scanning is carried out from the last stage gate driving circuit unit to the first stage gate driving circuit unit. As such, the forward scanning and the reverse scanning can be achieved by exchanging the waveforms of the clock signals while keeping the circuit structure unchanged.

A working principle of the gate driving circuit provided by the embodiment of the present application is as follows: during the forward scanning, from top to bottom, a scanning from the first stage gate driving circuit unit to the last-stage gate driving circuit unit is carried out. Taking the Nth stage gate driving circuit unit is an example. During a reset stage, the reset signal Rst is at a high potential, and potentials of the output terminal G(N−2) of the (N−2)th stage gate driving circuit unit and the output terminal G(N+2) of the (N+2)th stage gate driving circuit unit are both low potentials, potentials of the Nth stage clock signal CK(N) and the (N+6)th stage clock signal CK(N+6) are both low potentials, so that the seventeenth transistor T17 and the eighteenth transistor T18 are turned on and other transistors are turned off, thereby resetting potentials of the first node Q and the output terminal G(N) of the Nth stage gate driving circuit unit to zero. At the beginning of a scanning, the potential of the output terminal G(N−2) of the (N−2)th stage gate driving circuit unit is a high potential, a potential of the output terminal G(N+2) of the (N+2)th stage gate driving circuit unit is a low potential, so that the first transistor T1 is turned on and the second transistor T2 is turned off. The high potential of the output terminal G(N−2) of the (N−2)th stage gate driving circuit unit is output to the first node Q through the first transistor T1, so that a potential of the first node Q is raised from a low potential to a high potential to render the third transistor T3 to be turned on. The Nth stage clock signal CK(N) is at a high potential, and the high potential of the Nth stage clock signal CK(N) is output to the output terminal G(N) of the Nth stage gate driving circuit unit by the third transistor T3, so that the potential of the Nth stage scanning signal is raised from the low potential to the high potential. At the end of the scanning, the (N+6)th stage clock signal CK(N+6) is at a high potential, and the fourth transistor T4 is turned on, so that the potential of the first node Q is pulled down from a high potential to a low potential. The third transistor T3 is turned off, a low potential of the CK(N) is output to the output terminal G(N) of the Nth stage gate driving circuit unit by the third transistor T3, so that the potential of the Nth stage scanning signal is pulled down from the high potential to the low potential. Taking the first pull-down maintaining module 51 being configured to maintain the low potential after the pull-down of the potential of the Nth stage scanning signal as an example, the first clock signal LC1 is at a high potential, the fifth transistor T5 and the sixth transistor T6 are both turned on, and the high potential of the first clock signal LC1 is output to the ninth transistor T9 and the tenth transistor T10 to render the ninth transistor T9 and the tenth transistor T10 to be turned on. Then, the direct current low level signal VGL is output to the output terminal G(N) of the Nth stage gate driving circuit unit, so that the potential of the Nth stage scanning signal is maintained at a low potential. At the same time, the direct current low level signal VGL is output to the first node Q, so that the potential of the first node Q is maintained at the low potential.

During the reverse scanning, from bottom to top, the gate driving circuit is scanned from the last stage of the gate driving circuit unit to the first stage of the gate driving circuit unit by exchanging the waveforms of the clock signals. During a reset stage, the reset signal Rst is at a high potential, and potentials of the output terminal G(N−2) of the (N−2)th stage gate driving circuit unit and the output terminal G(N+2) of the (N+2)th stage gate driving circuit unit are both low potentials, potentials of the Nth stage clock signal CK(N) and the (N+6)th stage clock signal CK(N+6) are both low potentials, so that the seventeenth transistor T17 and the eighteenth transistor T18 are turned on and other transistors are turned off, thereby resetting potentials of the first node Q and the output terminal G(N) of the Nth stage gate driving circuit unit to zero. At the beginning of a scanning, the potential of the output terminal G(N+2) of the (N+2)th stage gate driving circuit unit is a high potential, and the potential of the output terminal G(N−2) of the (N−2)th stage gate driving circuit unit (N−2) is a low potential, so that the second transistor T2 is turned on and the first transistor T1 is turned off. The high potential of the output terminal G(N+2) of the (N+2)th stage gate driving circuit unit is output to the first node Q through the second transistor T2, so that a potential of the first node Q is raised from a low potential to a high potential render the third transistor T3 to be turned on. The Nth stage clock signal CK(N) is at a high potential, and the high potential of the Nth stage clock signal CK(N) is output to the output terminal G(N) of the Nth stage gate driving circuit unit by the third transistors T3, so that the potential of the Nth stage scanning signal is raised from the low potential to the high potential. At the end of the scanning, the (N+6)th stage clock signal CK(N+6) is at a high potential, and the fourth transistor T4 is turned on, so that the potential of the first node Q is pulled down from a high potential to a low potential. The third transistor T3 is turned off, a low potential of the CK(N) is output to the output terminal G(N) of the Nth stage gate driving circuit unit by the third transistor T3, so that the potential of the Nth stage scanning signal is pulled down from the high potential to the low potential. Taking the second pull-down maintaining module 52 being configured to maintain the low potential after the pull-down of the potential of the Nth stage scanning signal as an example, the second clock signal LC2 is at a high potential, the eleventh transistor T11 and the twelfth transistor T12 are both turned on, and the high potential of the second clock signal LC2 is output to the fifteenth transistor T15 and the sixteenth transistor T16 to render the fifteenth transistor T15 and the sixteenth transistor T16 to be turned on. Then, the direct current low level signal VGL is output to the output terminal G(N) of the Nth stage gate driving circuit unit, so that the potential of the Nth stage scanning signal is maintained at a low potential. At the same time, the direct current low level signal VGL is output to the first node Q, so that the potential of the first node Q is maintained at the low potential.

Figure 6:
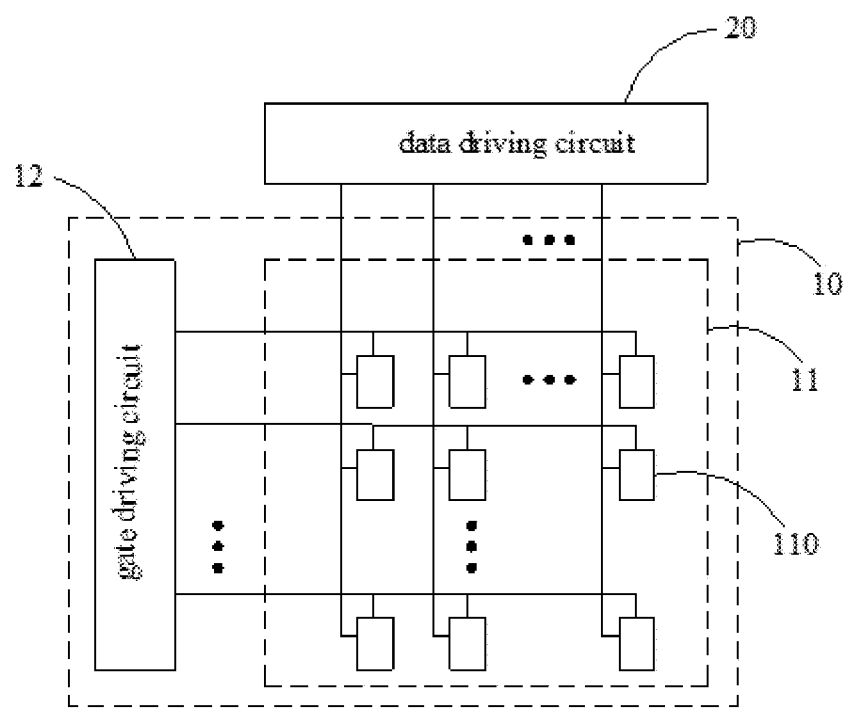
FIG. 6 is a schematic structural diagram of a display panel provided by an embodiment of the present application.

According to the gate driving circuit provided by the embodiments of the present application mentioned above, embodiments of the present application further provide a display panel. The display panel may be, but is not limited to, an in-cell touch display panel applied to an active pen. As shown in FIG. 6, FIG. 6 is a schematic structural diagram of a display panel provided by an embodiment of the present application. The display panel may be a liquid crystal display panel or an organic light-emitting diode display panel. The display panel includes a display panel body 10 and a data driving circuit 20. The display panel body 10 includes a display panel pixel area 11 and a gate driving circuit 12 as provided in any of the above embodiments. The gate driving circuit 12 is disposed on at least one side of the display panel pixel area 11. The display panel pixel area 11 is provided with a plurality of pixel units 110 in an array. The display panel can be applied to, but is not limited to, display devices such as smartphones, smart watches, desktop computers, laptops, and televisions.

Beneficial effects of embodiments of the present application: embodiments of the present application provide a gate driving circuit and a display panel. The gate driving circuit includes a plurality of driving circuit units in cascade. An Nth stage gate driving circuit unit includes a first pull-up controlling module, a second pull-up controlling module, a pull-up module, and a pull-down maintaining module. During a forward scanning, the first pull-up controlling module is configured to render the pull-up module to be turned on at the beginning of a scanning, and the pull-up module is further configured to pulled down a potential of the output terminal of the Nth stage gate driving circuit unit to a low potential at the end of the scanning. During a reverse scanning, the second pull-up controlling module is configured to render the pull-up module to be turned on at the beginning of a scanning, and the pull-up module is further configured to pull down a potential of the output terminal of the Nth stage gate driving circuit unit to a low potential at the end of the scanning. Thus, two scanning modes of the forward scanning and the reverse scanning of the in-cell touch display panel applied to active pen are achieved, thereby increasing freedom of use of the display panel, and reducing power consumption of the display panel.

In summary, although the present application has been disclosed as above with preferred embodiments, the above preferred embodiments are not intended to limit the present application. Those of ordinary skill in the art can make various modifications without departing from the spirit and scope of the present application. Therefore, the protection scope of this application is based on the scope defined by the claims.

What is claimed is:

1. A gate driving circuit, comprising a plurality of gate driving circuit units connected in cascade, and an Nth stage gate driving circuit unit comprising:
    a first pull-up controlling module electrically connected to an output terminal of an (N−2)th stage gate driving circuit unit and a first node, respectively;
    a second pull-up controlling module electrically connected to an output terminal of an (N+2)th stage gate driving circuit unit and the first node, respectively;

a pull-up module configured to receive an Nth stage clock signal, and electrically connected to the first node and an output terminal of the Nth stage gate driving circuit unit; and a pull-down maintaining module configured to receive a direct current low level signal, and electrically connected to the first node and the output terminal of the Nth stage gate driving circuit unit, respectively;

wherein during a forward scanning, the first pull-up controlling module is configured to render the pull-up module to be turned on at the beginning of a scanning, and the pull-up module is further configured to pulled down a potential of the output terminal of the Nth stage gate driving circuit unit to a low potential at the end of the scanning; and during a reverse scanning, the second pull-up controlling module is configured to render the pull-up module to be turned on at the beginning of a scanning, and the pull-up module is further configured to pull down a potential of the output terminal of the Nth stage gate driving circuit unit to a low potential at the end of the scanning.

2. The gate driving circuit of claim 1, wherein the first pull-up controlling module comprises a first transistor, a gate and a first terminal of the first transistor are electrically connected to the output terminal of the (N−2)th stage gate driving circuit unit, and a second terminal of the first transistor is electrically connected to the first node.

3. The gate driving circuit of claim 1, wherein the second pull-up controlling module comprises a second transistor, a gate and a first terminal of the second transistor are electrically connected to the output terminal of the (N+2)th stage gate driving circuit unit, and a second terminal of the second transistor is electrically connected to the first node.

4. The gate driving circuit of claim 1, wherein the pull-up module comprises a third transistor, a gate of the third transistor is electrically connected to the first node, a first terminal of the third transistor is configured to receive the Nth stage clock signal, and a second terminal of the third transistor is electrically connected to the output terminal of the Nth stage gate driving circuit unit.

5. The gate driving circuit of claim 1, wherein the pull-down maintaining module comprises a first pull-down maintaining module and a second pull-down maintaining module;

the first pull-down maintaining module is configured to receive a first clock signal and the direct current low level signal, and is electrically connected to the first node and the output terminal of the Nth stage gate driving circuit unit, respectively;

the second pull-down maintaining module is configured to receive a second clock signal and the direct current low level signal, and the second pull-down maintaining module is electrically connected to the first node and the output terminal of the Nth stage gate driving circuit unit.

6. The gate driving circuit of claim 5, wherein the first pull-down maintaining module comprises a fifth transistor, a sixth transistor, a seventh transistor, an eighth transistor, a ninth transistor, and a tenth transistor; and wherein a gate and a first terminal of the fifth transistor, and a first terminal of the sixth transistor are configured to receive the first clock signal;

a second terminal of the fifth transistor is electrically connected to a gate of the sixth transistor and a first terminal of the seventh transistor;

a second terminal of the sixth transistor is electrically connected to a first terminal of the eighth transistor, a gate of the ninth transistor, and a gate of the tenth transistor;

a gate of the seventh transistor, a gate of the eighth transistor and a first terminal of the tenth transistor are electrically connected to the first node;

a first terminal of the ninth transistor is electrically connected to the output terminal of the Nth stage gate driving circuit unit;

and a second terminal of the seventh transistor, a second terminal of the eighth transistor, a second terminal of the ninth transistor, and a second terminal of the tenth transistor are configured to receive the direct current low level signal.

7. The gate driving circuit of claim 5, wherein the second pull-down maintaining module comprises an eleventh transistor, a twelfth transistor, a thirteenth transistor, a fourteenth transistor, and a fifteenth transistor, and a sixteenth transistor; and wherein a gate and a first terminal of the eleventh transistor, and a first terminal of the twelfth transistor are configured to receive the second clock signal;

a second terminal of the eleventh transistor is electrically connected to a gate of the twelfth transistor and a first terminal of the thirteenth transistor;

a second terminal of the twelfth transistor is electrically connected to a first terminal of the fourteenth transistor, a gate of the fifteenth transistor, and a gate of the sixteenth transistor;

a gate of the thirteenth transistor, a gate of the fourteenth transistor, and a first terminal of the sixteenth transistor are electrically connected to the first node;

a first terminal of the fifteenth transistor is electrically connected to the output terminal of the Nth stage gate driving circuit unit; and a second terminal of the thirteenth transistor, a second terminal of the fourteenth transistor, a second terminal of the fifteenth transistor, and a second terminal of the sixteenth transistor are configured to receive the direct current low level signal.

8. The gate driving circuit of claim 5, wherein the pull-down maintaining module further comprises a pull-down module, the pull-down module comprises a fourth transistor, a gate of the fourth transistor is configured to receive the (N+6)th stage clock signal, a first terminal of the fourth transistor is electrically connected to the first node, and a second terminal of the fourth transistor is configured to receive the direct current low level signal.

9. The gate driving circuit of claim 1, wherein the Nth stage gate driving circuit unit further comprises a bootstrap capacitor, and the bootstrap capacitor is electrically connected to the first node and the output terminal of the Nth stage gate driving circuit unit.

10. The gate driving circuit of claim 1, further comprising a reset module, the reset module comprising:

a seventeenth transistor, wherein a gate of the seventeenth transistor is configured to receive a reset signal, a first terminal of the seventeenth transistor is electrically connected to the first node, and a second terminal of the seventeenth transistor is configured to receive the direct current low level signal; and an eighteenth transistor, wherein a gate of the eighteenth transistor is configured to receive the reset signal, a first terminal of the eighteenth transistor is electrically connected to the output terminal of the Nth stage gate driving circuit unit, and a second terminal of the eighteenth transistor is configured to receive the direct current low level signal.

11. A display panel, comprising a gate driving circuit, the gate driving circuit comprising a plurality of gate driving circuit units connected in cascade, and an Nth stage gate driving circuit unit comprising:
a first pull-up controlling module electrically connected to an output terminal of an (N−2)th stage gate driving circuit unit and a first node, respectively;
a second pull-up controlling module electrically connected to an output terminal of an (N+2)th stage gate driving circuit unit and the first node, respectively;
a pull-up module configured to receive an Nth stage clock signal, and electrically connected to the first node and an output terminal of the Nth stage gate driving circuit unit; and
a pull-down maintaining module configured to receive a direct current low level signal, and electrically connected to the first node and the output terminal of the Nth stage gate driving circuit unit, respectively;
wherein during a forward scanning, the first pull-up controlling module is configured to render the pull-up module to be turned on at the beginning of a scanning, and the pull-up module is configured to pulled down a potential of the output terminal of the Nth stage gate driving circuit unit to a low potential at the end of the scanning; and during a reverse scanning, the second pull-up controlling module is configured to render the pull-up module to be turned on at the beginning of a scanning, and the pull-up module is configured to pull down a potential of the output terminal of the Nth stage gate driving circuit unit to a low potential at the end of the scanning.

12. The gate driving circuit of claim 11, wherein the first pull-up controlling module comprises a first transistor, a gate and a first terminal of the first transistor are electrically connected to the output terminal of the (N−2)th stage gate driving circuit unit, and a second terminal of the first transistor is electrically connected to the first node.

13. The gate driving circuit of claim 11, wherein the second pull-up controlling module comprises a second transistor, a gate and a first terminal of the second transistor are electrically connected to the output terminal of the (N+2)th stage gate driving circuit unit, and a second terminal of the second transistor is electrically connected to the first node.

14. The gate driving circuit of claim 11, wherein the pull-up module comprises a third transistor, a gate of the third transistor is electrically connected to the first node, a first terminal of the third transistor is configured to receive the Nth stage clock signal, and a second terminal of the third transistor is electrically connected to the output terminal of the Nth stage gate driving circuit unit.

15. The gate driving circuit of claim 11, wherein the pull-down maintaining module comprises a first pull-down maintaining module and a second pull-down maintaining module;
the first pull-down maintaining module is configured to receive a first clock signal and the direct current low level signal, and is electrically connected to the first node and the output terminal of the Nth stage gate driving circuit unit, respectively;
the second pull-down maintaining module is configured to receive a second clock signal and the direct current low level signal, and the second pull-down maintaining module is electrically connected to the first node and the output terminal of the Nth stage gate driving circuit unit.

16. The gate driving circuit of claim 15, wherein the first pull-down maintaining module comprises a fifth transistor, a sixth transistor, a seventh transistor, an eighth transistor, a ninth transistor, and a tenth transistor; and
wherein a gate and a first terminal of the fifth transistor, and a first terminal of the sixth transistor are configured to receive the first clock signal;
a second terminal of the fifth transistor is electrically connected to a gate of the sixth transistor and a first terminal of the seventh transistor;
a second terminal of the sixth transistor is electrically connected to a first terminal of the eighth transistor, a gate of the ninth transistor, and a gate of the tenth transistor;
a gate of the seventh transistor, a gate of the eighth transistor and a first terminal of the tenth transistor are electrically connected to the first node;
a first terminal of the ninth transistor is electrically connected to the output terminal of the Nth stage gate driving circuit unit;
and a second terminal of the seventh transistor, a second terminal of the eighth transistor, a second terminal of the ninth transistor, and a second terminal of the tenth transistor are configured to receive the direct current low level signal.

17. The gate driving circuit of claim 15, wherein the second pull-down maintaining module comprises an eleventh transistor, a twelfth transistor, a thirteenth transistor, a fourteenth transistor, and a fifteenth transistor, and a sixteenth transistor; and
wherein a gate and a first terminal of the eleventh transistor, and a first terminal of the twelfth transistor are configured to receive the second clock signal; and
a second terminal of the eleventh transistor is electrically connected to a gate of the twelfth transistor and a first terminal of the thirteenth transistor;
a second terminal of the twelfth transistor is electrically connected to a first terminal of the fourteenth transistor, a gate of the fifteenth transistor, and a gate of the sixteenth transistor;
a gate of the thirteenth transistor, a gate of the fourteenth transistor, and a first terminal of the sixteenth transistor are electrically connected to the first node;
a first terminal of the fifteenth transistor is electrically connected to the output terminal of the Nth stage gate driving circuit unit; and
a second terminal of the thirteenth transistor, a second terminal of the fourteenth transistor, a second terminal of the fifteenth transistor, and a second terminal of the sixteenth transistor are configured to receive the direct current low level signal.

18. The gate driving circuit of claim 15, wherein the pull-down maintaining module further comprises a pull-down module, pull-down module comprises a fourth transistor, a gate of the fourth transistor is configured to receive the (N+6)th stage clock signal, a first terminal of the fourth transistor is electrically connected to the first node, and a second terminal of the fourth transistor is configured to receive the direct current low level signal.

19. The gate driving circuit of claim 11, wherein the Nth stage gate driving circuit unit further comprises a bootstrap capacitor, and the bootstrap capacitor is electrically connected to the first node and the output terminal of the Nth stage gate driving circuit unit.

20. The gate driving circuit of claim 11, further comprising a reset module, the reset module comprising:
- a seventeenth transistor, wherein a gate of the seventeenth transistor is configured to receive a reset signal, a first terminal of the seventeenth transistor is electrically connected to the first node, and a second terminal of the seventeenth transistor is configured to receive the direct current low level signal; and
- an eighteenth transistor, wherein a gate of the eighteenth transistor is configured to receive the reset signal, a first terminal of the eighteenth transistor is electrically connected to the output terminal of the Nth stage gate driving circuit unit, and a second terminal of the eighteenth transistor is configured to receive the direct current low level signal.

* * * * *